United States Patent Office 2,753,969
Patented July 10, 1956

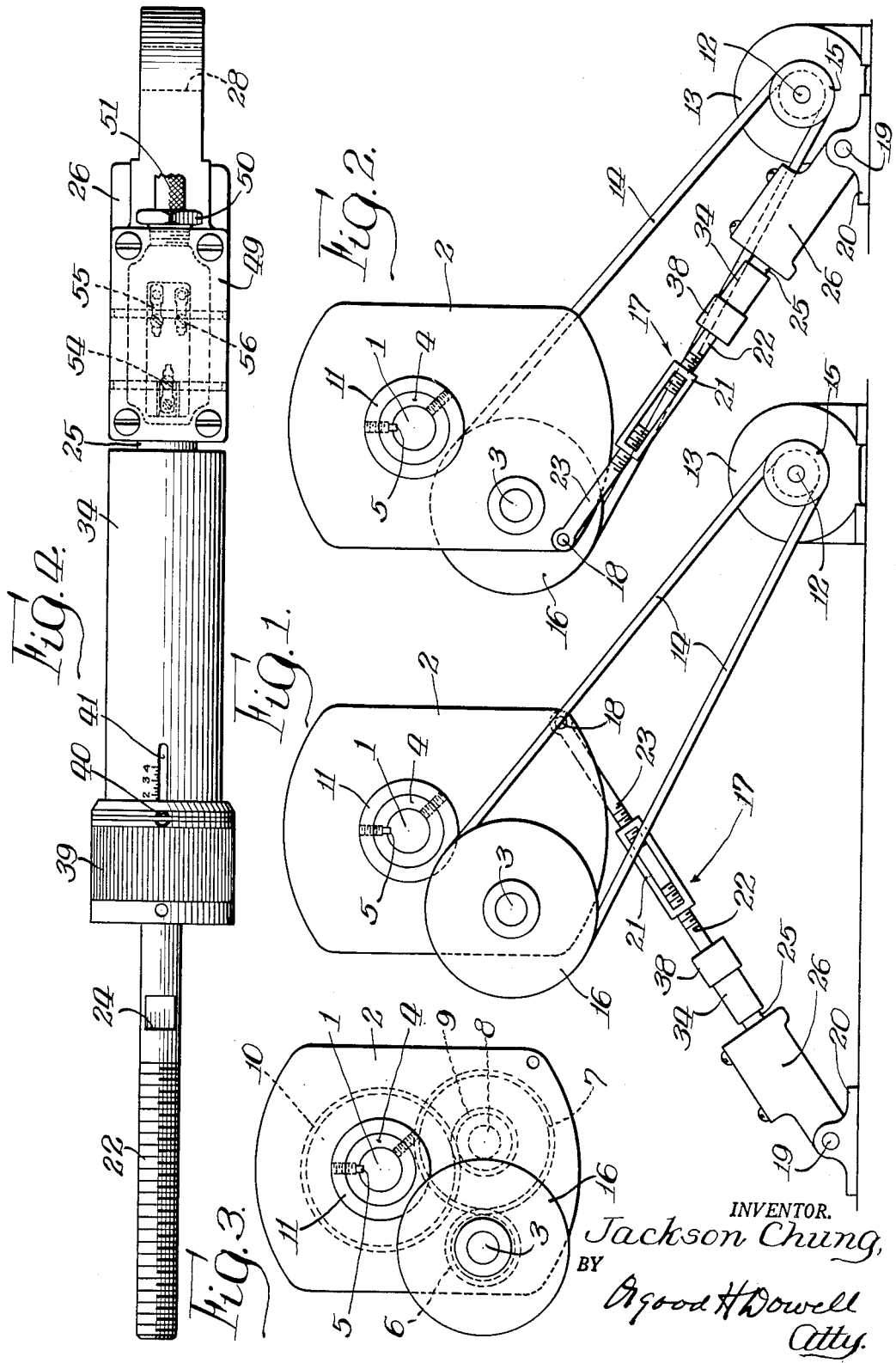

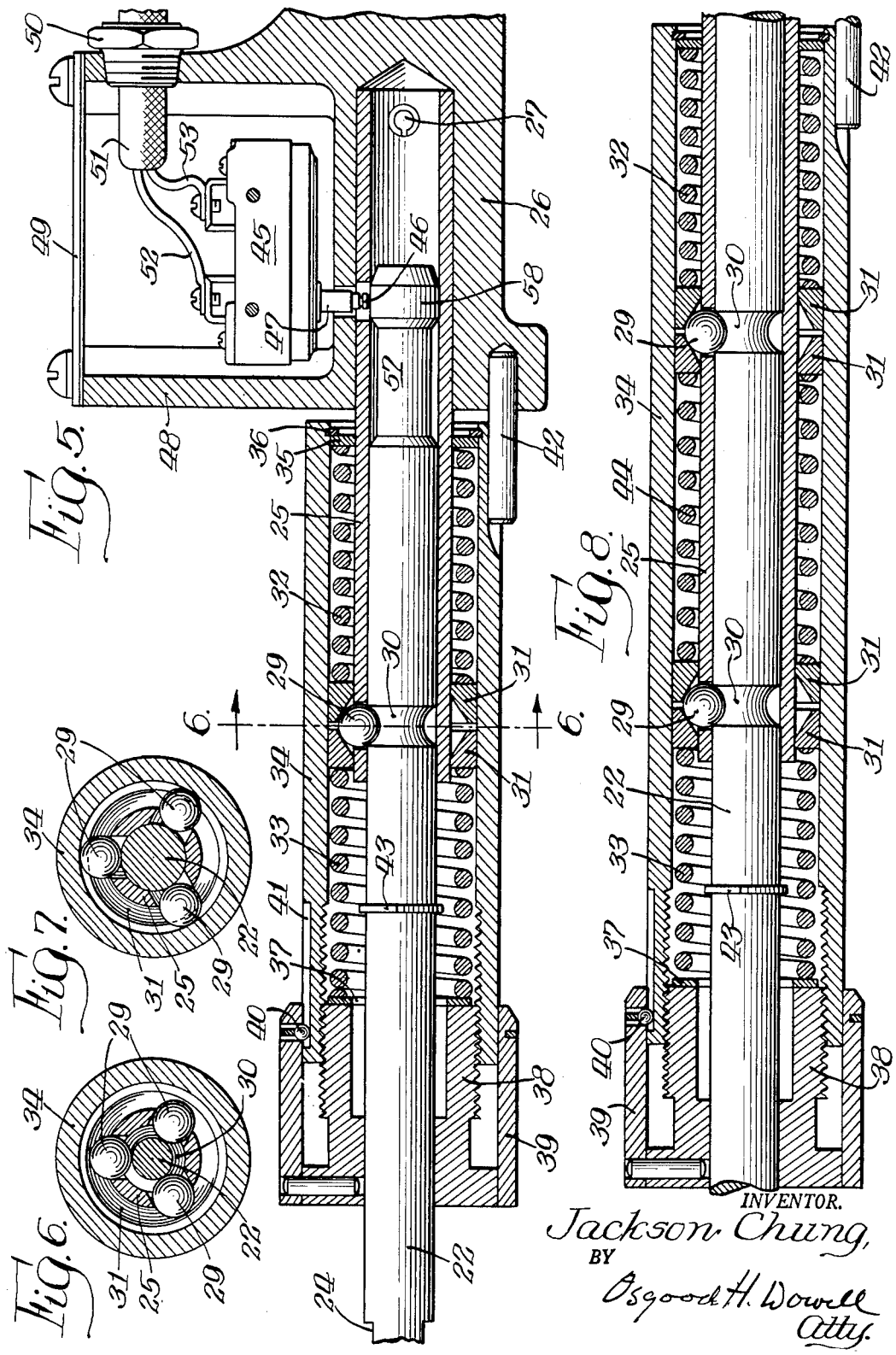

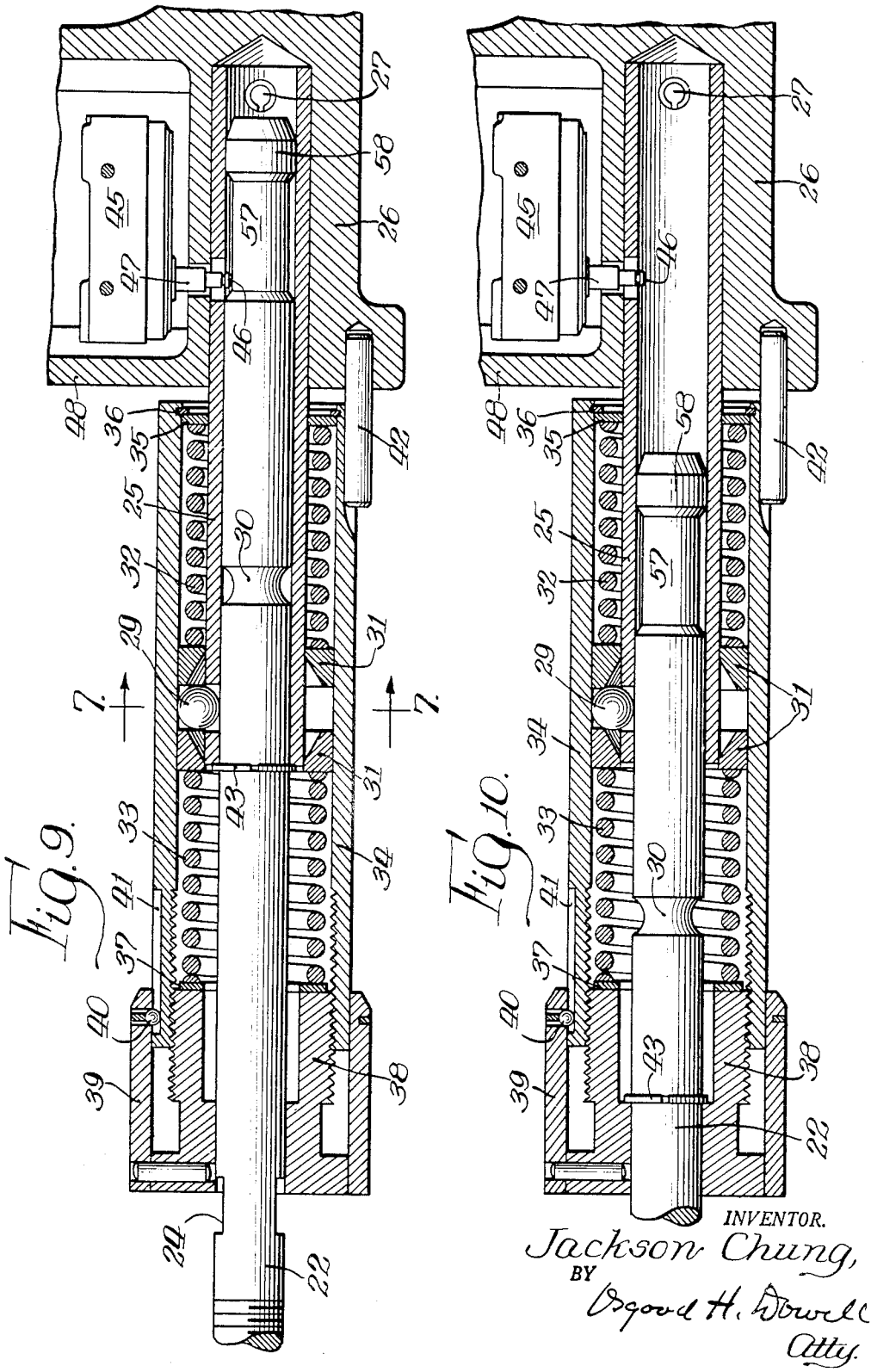

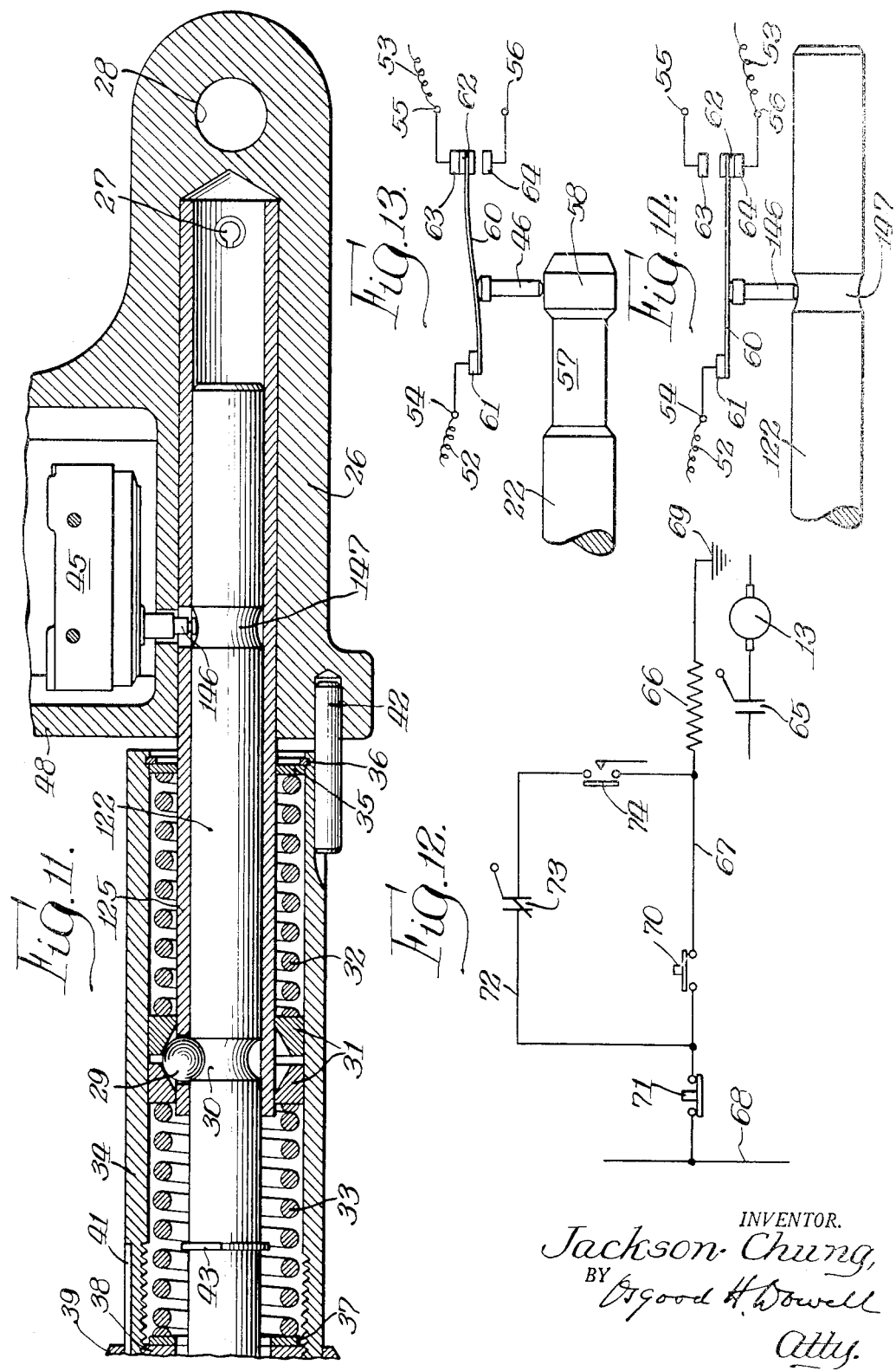

2,753,969
POWER TRANSMISSION UNITS WITH OVERLOAD RELEASE MEANS

Jackson Chung, South Bend, Ind., assignor to Dodge Manufacturing Corporation, Mishawaka, Ind., a corporation of Indiana Application November 7, 1951, Serial No. 255,274

8 Claims. (Cl. 192—150)

Machine shafts are commonly driven through speed-reducing transmission units supported by such shafts. A unit of the type referred to comprises gearing in a case rotatably mounted on the driven shaft and carrying a power-input shaft connected by said gearing to said driven shaft, said power-input shaft being belt-driven from a stationarily mounted motor and the gear case being held in belt-tensioning position by a torque arm or connecting rod pivoted at one end to the gear case and at the other end to a fixture, said torque arm being arranged to function either as a compression member or as a tension member to resist reaction of torque of the driven shaft on the gear case. The torque arm usually includes a turnbuckle for adjusting its length. By operation of the turnbuckle, the position at which the gear ease is held can be adjusted for adjusting the tension of the driving belt.

The primary object of the present invention is to provide, in an organization such as above described, a means whereby a predetermined overload on the driven shaft will cause a relief of tension of the driving belt, allowing it to slip on one or the other of the belt pulleys. This is accomplished by providing a means in the torque arm enabling it when subjected to a load in excess of a predetermined value to release the connection which it normally establishes, and by arranging the belt drive from the motor to permit such release action. The torque arm comprises relatively longitudinally movable sections normally held in fixed axial relation by spring-held locking means releasable by a forced relative displacement of said sections when the longitudinal force on the torque arm exceeds the predetermined value. The relative movement of said sections is in the direction of the applied force on the torque arm, so that the releasing action shortens the torque arm if working in compression and lengthens it if working in tension. To permit this action, the motor is arranged so that the tension of the driving belt imposes a turning moment on the gear case in the direction of torque reaction, wherefore the release action of the torque arm will shorten the distance between centers of the belt pulleys.

A further feature of the invention is a limit switch controlled by the torque arm, which switch may be connected in an electric circuit to perform a desired function when release action occurs, e. g. to stop the motor or to sound an alarm or to exercise remote control of auxiliary equipment.

The invention includes a novel overload release device for use as a connector of the connecting rod type, which in this instance is employed as a part of the torque arm. Objects of the invention include the provision of a practicable and reliable connector adapted to carry a predetermined load along its longitudinal axis, either in compression or tension, and to shorten or lengthen in the direction of the applied force when it exceeds a predetermined value; and the provision of a connector of said type having a limit switch carried and controlled thereby. Further objects are a connector of said type which can be easily adjusted to effect release action at different predetermined loads, one which after releasing action can be readily restored to normal operative condition by a simple movement, and one which is economical to manufacture.

Assemblies embodying the several features of the invention are represented by Figs. 1 and 2 of the accompanying drawings.

Figs. 1 and 2 are front end elevations of machinery drives employing a speed-reducing unit of the type aforesaid held in fixed position by a torque arm arranged in Fig. 1 as a tension member and in Fig. 2 as a compression member, said figures being otherwise substantially identical.

Fig. 3 is a front view of the gear case of said unit, showing in dotted lines the speed-reducing gearing therein.

Fig. 4 is a top plan view of an overload release connector employed as a part of the torque arm shown in Figs. 1 and 2.

Fig. 5 is a longitudinal vertical section of said connector, end portions thereof being broken away for compactness of illustration.

Fig. 6 is a cross section on the line 6—6 of Fig. 5.

Fig. 7 is a cross section on the line 7—7 of Fig. 9.

Fig. 8 is a partial longitudinal section of a connector modified for increased load-carrying capacity by having two sets of locking elements.

Fig. 9 is a partial longitudinal sectional view of the connector of Fig. 5 showing the mechanism in released condition due to a longitudinal force in compression.

Fig. 10 is a similar view showing the mechanism in release condition due to a longitudinal force in tension.

Fig. 11 is a partial longitudinal sectional view of a connector similar to that of Fig. 5 except for a modified means to control operation of the limit switch.

Fig. 12 is a diagram of a motor controlling circuit controlled by a limit switch to shut off the motive power on release action of the torque arm.

Fig. 13 is a diagrammatic representation of a limit switch arranged for use with the switch-controlling means shown in Fig. 5.

Fig. 14 is a diagrammatic representation of a limit switch of said type arranged for use with the switch controlling means shown in Fig. 9.

In the drawings, 1 denotes a machine shaft to be driven, this shaft being mounted in suitable bearings not shown. Removably mounted on said shaft is a transmission unit comprising speed-reducing gearing in a gear case 2 carrying a power-input shaft 3 connected by said gearing to a tubular power-output shaft or sleeve 4 on which the gear case is rotatably mounted, said power-input shaft being parallel with and spaced laterally from said sleeve which is closely slip-fitted on the shaft 1 and secured thereto in driving connection therewith by a key 5. The particular unit shown is of the construction disclosed in a pending application of Alexander T. Bodle, Serial No. 160,670, filed May 8, 1950, now Patent No. 2,655,818 issued October 20, 1953. The speed-reducing gearing comprises in this instance a pinion 6 on the power-input shaft meshing with a gear 7 on an intermediate shaft 8, and a pinion 9 on said intermediate shaft meshing with a gear 10 on said sleeve 4. Said sleeve extends through the opposite walls of the gear case and is fastened to the shaft 1 by set-screwed clamping collars one of which is shown at 11.

The gear case 2 may be considered as rotatably mounted on the shaft 1, since it is so mounted on the sleeve 4 fixed on said shaft; however the gear case is normally held from rotative movement by the torque arm. The speed-reducing gearing in said case may be considered as connecting the power-input shaft 3 to the driven shaft 1, since the sleeve 4 fixed to said shaft is in effect the hub of the driven gear 10 of said gearing.

The power-input shaft 3 is belt-driven from the shaft 12 of a stationarily mounted electric motor 13 shown resting on and fastened to the floor of the room in which the machinery is installed. The belt drive shown comprises a V-type belt 14 engaging a driving sheave 15 on the motor shaft and a driven sheave 16 on the power-input shaft. It will be understood that the power-input shaft, supported in suitable bearings in the gear case, may extend through and beyond either the front or back wall of the gear case to carry the pulley 16, which is shown in front of the gear case in Fig. 1, though in Fig. 2 said pulley is shown behind the gear case to avoid obscuring the showing of the torque arm. The arrangement shown in Fig. 1 is preferred as it locates the pulley 16 in a plane in front of the stub end of the shaft 1 and hence permits use of a pulley 16 of larger diameter than would be permissible with the arrangement shown in Fig. 2. A desired speed reduction may be obtained by the belt drive, depending of course upon the ratio of pitch diameters of the driving and driven sheaves. Instead of the belt drive shown, a drive of the multiple V-belt type or a drive of the chain and sprocket type may be substituted as an equivalent.

The numeral 17 designates as a whole a torque arm pivoted at one end by the bolt 18 to the gear case 2 and at its other end by the bolt 19 to a fixed anchorage provided in this instance by a bracket 20 fastened to the floor. This torque arm includes the overload release connector of Figs. 4 to 10 and also a turnbuckle 21 by which the torque arm can be shortened or lengthened to adjust the angular position at which the gear case is held. The position at which the gear case should be held depends upon the arrangement of the belt drive and the distance between belt-pulley centers required for belt tensioning. The torque arm may be variously arranged to suit different requirements and conditions. For example, looking at either Fig. 1 or Fig. 2, it will be apparent that by fastening the floor bracket 20 in a position either to the right or left of that shown, the angular position of the gear case on shaft 1 could be substantially changed to suit a shorter or longer driving belt or a different arrangement thereof.

The torque arm, which normally resists torque reaction on the gear case 2, may be arranged either as a tension member or as a compression member. Assuming, for example, that the shaft 1 as viewed in Figs. 1 and 2 is driven in a clockwise direction, the torque reaction on the gear case is in a counter-clockwise direction, wherefore the torque arm arranged as in Fig. 1 functions as a tension member and as arranged in Fig. 2 functions as a compression member. If the direction in which the shaft is driven were reversed, the torque arm arranged as in Fig. 1 would work in compression, and as arranged in Fig. 2 would work in tension.

The torque arm comprises a rod 22 having a screw-threaded portion engaged by one end of the turnbuckle 21 the other end of which engages a threaded rod 23 having an eye through which passes the pivot bolt 18 by which the torque arm is pivoted to the gear case. Referring to Figs. 4 to 10, the rod 22 extends into a tube 25 in which said rod is slidably and preferably rotatably fitted. Said rod 22 is formed near its threaded portion with wrench slots 24 for engagement by a wrench to hold the rod from turning as the turnbuckle is operated to shorten or lengthen the torque arm. The rod 22 is normally held in fixed axial relation to the tube 25 by locking means presently to be described. Said tube 25 extends into a bore in a hinge member 26 to which said tube is fixed by the pin 27. A transverse bore 28 in said member receives the pivot bolt 19 by which the torque arm is pivoted to the floor bracket 20 or other fixture adapted to sustain the load on the torque arm, whether in compression or tension.

The rod 22 is releasably locked to the tube 25 by a plurality of steel balls 29 seated in a cam groove 30 in said rod and held in appropriately angularly spaced relation in holes therefor in said tube, in which holes the balls are fitted for radial movement. Said balls engage the inside conical surfaces of a pair of confronting cup rings or camming washers 31 slidable on said tube. Said cup rings are forced toward each other to hold the balls seated in said groove by a pair of balanced compression springs 32 and 33 fitted and housed in an outer tube or casing 34.

The spring 32 is compressed between one of said cup rings and a washer 35 abutting a shoulder 36 in the rear end of the spring housing, which shoulder is provided by an expansible snap ring sprung into an annular groove in said housing. The spring 33 is compressed between the other cup ring and a washer 37 abutting an adjusting nut 38 slidably and rotatably fitted on the rod 22 and screwing into the fore end of the spring housing 34. By rotating said nut, the tension of the springs 32 and 33 can be adjusted to increase or decrease the load-carrying capacity of the torque arm.

Said adjusting nut 38 has fixed thereto a sleeve 39 enclosing the fore end of the spring housing and having a detent for releasably locking said nut in adjusted position, said detent comprising a spring-loaded ball 40 engaging in a longitudinal groove 41 in said spring housing and disengageable therefrom by a forced rotative movement of the adjusting nut. As shown in Fig. 4, a scale associated with the groove 41 provides for calibration of the spring pressure.

The spring housing 34 is held from rotative movement by a key 42, fixed to the hinge member 26 and engaging a groove in said housing.

The rod 22 and tube 25 exemplify telescoping parts of relatively axially displaceable torque arm sections releasably held in fixed axial relation by the locking means, one of said sections comprising the turnbuckle 21 and rods 22 and 23 connected thereby, the other section comprising the tube 25 and hinge member 26 to which it is attached.

When the load on the torque arm exceeds the load-carrying capacity of the locking means, the resultant axial movement of the rod 22 relative to the tube 25 will force the balls 29 radially outwardly by camming action of the cam groove 30, with accompanying forcing apart of the cup rings 31 against the resistance of the springs 32 and 33. This movement will displace the cam groove 30 relative to the balls, so that they will bear on said rod at one side or the other of the cam groove, according to the direction of the applied force, thus releasing the rod from its locked position and permitting it to slide axially in the tube. The movement of the rod 22 in the releasing action is in the direction of the applied force, i. e. in a direction to shorten the torque arm if arranged as a compression member, and in a direction to lengthen the torque arm if arranged as a tension member, as will be readily understood from Figs. 9 and 10.

The locking means shown is designed to obtain a relatively high mechanical advantage of the springs 32 and 33 to resist releasing action, due to the moderate slope of the inside conical surfaces of the cup rings 31. When the balls 29 are cammed outwardly to a position such that they bear against the inside edges of the adjacent ends of the cup rings, the mechanical advantage is lessened, permitting instant release of the rod 22 from its locked position.

Thus the torque arm is adapted to carry a predetermined load along its longitudinal axis, either in compression or tension, and to shorten or lengthen in the direction of the applied force when it exceeds the predetermined value, thereby releasing the connection which the torque arm normally establishes between the gear case and the fixture to which the torque arm is anchored.

A shoulder 43 on the rod 22 limits its axial movement relative to the tube 25 when said rod is released from its locked position. If the torque arm works in compression, the movement of said rod when released is limited by abutment of said shoulder against the fore end of said tube, as shown in Fig. 9. If the torque arm works in tension, the movement of said rod when released is limited by abutment of said shoulder against the inner end of the adjusting nut 38 as shown in Fig. 10. Said shoulder 43 may be provided by a contractile snap ring engaging in an annular groove in said rod.

Referring to Figs. 1 and 2, it will be understood that the releasing action of the torque arm occurs in response to an overload on the driven shaft 1, causing a rotative movement of the gear case in the direction of torque reaction against the resistance of the springs 32 and 33. As previously indicated, the driving belt 14 is suitably arranged to permit this movement. That is to say, the motor 13 is so arranged that the tension of the driving belt imposes a turning moment on the gear case in the direction of torque reaction. Hence the release action of the torque arm will cause a shortening of the distance between centers of the belt pulleys, thus releasing the tension of the driving belt and allowing it to slip on one of the other of said pulleys. The degree of release of belt tension at the instant of release of the locking means will depend upon the angle of the line of centers of the belt pulleys to the line of centers of the shaft 1 and power-input shaft 3. Maximum release of belt tension at said instant is obtained by arranging the motor as above stated and with said lines of centers at an angle of or approximately ninety degrees. The rotative movement of the gear case necessary for the releasing action will be augmented by momentum of the gear case at the instant of release, resulting in a substantial slackening of the belt.

Since the overload release means is set to operate when the longitudinal force on the torque arm exceeds a predetermined value, it is desirable to minimize the normal load on the torque arm, which under best conditions is somewhat in excess of that imposed by torque reaction, a small percentage of such normal load on the torque arm being due to the belt tension. The amount of such normal load due to torque reaction depends upon the angle of the torque arm to the line of centers of the shaft 1 and pivot bolt 18. Minimization of such normal load on the torque arm, so that it only slightly exceeds the torque reaction by reason of belt tension, is obtained by arranging the torque arm at an angle of or approximately ninety degrees to said line of centers. If said angle be substantially greater or less than ninety degrees, the normal load on the torque arm will be correspondingly increased. However it is to be borne in mind that such an increase in such normal load on the torque arm may be compensated by increasing the tension of the springs 32 and 33 by operation of the adjusting nut 38.

Arrangements of the torque arm and driving belt to obtain minimum normal load on the torque arm and maximum relief of belt tension when overload release action occurs are shown in Figs. 1 and 2. In each of said figures, the torque arm is arranged at an angle of approximately ninety degrees to the line of centers of 1 and 18, and the line of centers of the belt pulleys is arranged at approximately a like angle to the line of centers of 1 and 3, the tension of the belt being in a direction to allow shortening of the distance between belt centers by rotative movement of the gear case in the direction of torque reaction.

The load-carrying capacity of the torque arm could be increased by modifying the overload release means as shown in Fig. 8, wherein the rod 22 and tube 25 are releasably locked in fixed axial relation by the set of balls 29 and associated elements already described and an additional set of such balls and elements spaced axially from the first. In this instance the springs 32 and 33 cooperate with an interposed spring 44 to resist release action, said spring 44 exerting the same force as others. The balls of the right hand set shown in Fig. 8 are held seated in the cam groove therefor by the balanced springs 32 and 44 pressing toward each other the cup rings associated with said set of balls. Likewise the balanced springs 33 and 44, pressing toward each other the cup rings associated with the left hand set of balls, hold them seated in the cam groove therefor. A cross section taken on the plane of centers of either set of balls in Fig. 8 would be the same as Fig. 6. A cross section taken on such plane when the locking means is released would be the same as Fig. 7.

As hereinbefore indicated, a further feature of the invention is a limit switch controlled by the torque arm to cause shutting off of motive power or other desired function when release action occurs. Any suitable switch controlled by means operated by relative movement of the rod 22 and tube 25 may be employed for this purpose.

In the drawings, the numeral 45 denotes the switch box of a snap action switch controlled by a plunger or push pin 46 to open or close when the plunger is pushed inwardly relative to said box and to reverse its operation when the plunger is released for outward movement relative to the box. Said plunger or push pin 46 exemplifies a switch actuator operated by relative movement of the rod 22 and tube 25.

The switch may be, for example, of the type disclosed in the patent to McGall No. 1,960,020, dated May 22, 1934, another form of which is shown in the patent to MacFarland No. 2,459,661, dated January 18, 1949. This is a normally open switch which by a system of leaf springs is spring-actuated to close when the plunger is pushed inwardly relative to the box, and held closed by spring action so long as the plunger is held in its innermost position in the box, but will open by spring action when the plunger is released from the holding force thereon. The switch plunger 46 is movable axially in a guide provided by a tubular protuberance 47 of the switch box. The plunger has an enlarged head within the box to limit its movement outwardly relative to the box and hence to prevent it from dropping out. The switch box 45 is of Bakelite or other suitable structural insulating material, as is also the plunger 46 or the head thereof.

The switch box 45 is mounted in fixed position relative to the hinge member 26 in a housing 48 formed on said member and closed by a removable cover plate 49. Screwed into a wall of said housing is a tubular plug 50 through which passes an electric cable 31 containing insulated circuit wires 52 and 53 (Fig. 5) for connection by the switch. In Fig. 4, there are indicated in dotted lines three switch terminals 54, 55 and 56. The wire 52 is electrically connected to the terminal 54. The wire 53 is electrically connected to one of the other terminals, in this instance the terminal 55. The third terminal 56 is for alternative use as will hereinafter appear.

The switch box is so located over the tube 25 that the protuberance or guide 47 is on the under side of the box and extends into or through an opening in the bottom wall of the housing 48. The plunger 46, which extends through an opening in the tube 25, is disposed radially relative to said tube and rod 22. In view of the position of the device shown in Figs. 4 to 11, the plunger may be conveniently described as movable axially between up and down positions, the up position thereof being its outer position relative to the rod 22 and its inner position relative to the switch box, and the down position of the plunger being its inner position relative to said rod and its outer position relative to the switch box.

The plunger 46 is normally held in its up position. As shown in Figs. 5, 9 and 10 the rod 22 is formed with a wide annular groove 57 reducing the diameter of said rod for a substantial portion of its length, said groove being adjacent to the rear end portion 58 of said rod, which portion is slidably fitted in the tube 25. Under normal operating conditions, the rod being locked to the tube, the plunger 46 bears on 58 and is thereby held in its up position. In the lock releasing operation, the movement of said rod relative to said tube displaces 58 from under the plunger, allowing it to drop to its down position. If the torque arm is arranged as a compression member, the rod moves rearwardly in the releasing operation, as shown in Fig. 9, allowing the plunger to drop to its down position in the groove 57. If the torque arm is arranged as a tension member, the rod moves forwardly in the releasing operation, allowing the plunger to drop to its down position behind 58, as shown in Fig. 10.

The rear end portion 58 of said rod is formed with beveled end surfaces whereby after a releasing operation movement of said rod to a position for the balls 29 to snap into the cam groove 30 will cam the plunger 46 to its up position on said portion 48.

In the modified structure shown in Fig. 11, the arrangement for controlling the position of the plunger is reversed, so that the plunger normally rests in its down position. In said Fig. 11, the telescoping rod and tube, being somewhat longer than in the structure hereinbefore described, are designated by the numerals 122 and 125, and the plunger is designated by the numeral 146. The rod 122 is formed with a narrow cam groove 157 and extends rearwardly a substantial distance from said groove. The plunger 146 normally bears on said rod in said groove. Otherwise the structure of Fig. 11 is the same as that first described. In the lock releasing operation, movement of the rod 122 in either direction will cam the plunger 146 out of the cam groove 147, so that the plunger will bear on the cylindrical portion of said rod behind said cam groove if release occurs in compression, and on the cylindrical portion of the rod in front of said cam groove if release occurs in tension. In short, the structure of Fig. 11 is substantially the same as that first described except for a reverse arrangement of the means for operating the switch actuator by the torque arm, requiring a reverse arrangement of the limit switch.

Fig. 13 diagrammatically represents a limit switch arranged for use in the structure of Fig. 5, and Fig. 14 diagrammatically represents the same or a similar switch arranged for use with the structure of Fig. 11.

In Figs. 13 and 14, the numeral 60 designates an electrically conductive contact arm represented as a leaf spring anchored at one end to a conducting element 61 fixed in the insulating switch box and electrically connected to the switch terminal 54 to which the circuit wire 52 is connected. The free end of said arm 60 is provided with a contact 62 arranged between a pair of contact bars or plates 63 and 64 fixed in the switch box and connected respectively to the switch terminals 55 and 56 to one of which the circuit wire 53 is connected. The spring arm 60 is normally biased to contact with 64 but is adapted to contact with 63 on movement of the switch plunger to its up position and to remain in contact with 63 so long as the switch plunger is held in such position.

In Fig. 13 the plunger 46 is normally held in its up position, and the circuit wire 53 is connected to the switch terminal 55, so that the contact 63 is live and the contact 64 dead. Thus the switch in Fig. 13 is a normally closed switch connecting the circuit wires 52 and 53 through conducting element 61, contact arm 60 and live contact 63. On release action of the torque arm, the plunger 46 drops to its down position, allowing the switch to open by spring action.

In Fig. 14, the plunger 146 is normally in the down position, and the circuit wire 53 is connected to the switch terminal 56. The arm 60 is now normally in contact with 64, which is the live contact, while 63 is dead. Thus the switch of Fig. 14 is a normally closed switch connecting the circuit wires 52 and 53 through 61, 60 and 64. On release operation of the torque arm, the plunger is raised to the up position, thereby opening the switch and holding it open until the telescoping parts of the torque arm are restored to normal relation.

Fig. 12 is a diagram of an electric circuit system controlled by the limit switch to shut off motive power when release action of the torque arm occurs. As represented by said diagram, the circuit of the electric motor 13 includes a normally open switch 65 operated to close by an electro-magnet the energizing coil of which is indicated at 66. The diagram represents a condition of the system which exist before energization of said coil, the switch 65 being open and the motor circuit being therefore open.

The circuit of said coil 66 is represented as a straight line circuit 67 leading from an electrically charged line 68 to a ground connection at 69. The circuit line 67 includes a normally open starting switch 70 of the push-button type, and a normally closed stop switch 71 which may also be of said type, said stop switch being between the charged line 68 and the starting switch 70. Connected in a shunt circuit 72 around the starting switch is the normally closed limit switch 73. In said shunt circuit, between the limit switch and coil 66, is a normally open interlock switch 74 controlled by the coil 66 to close when the coil is energized.

To start the motor, the push-button starting switch 70 is momentarily closed, with the effect of energizing the coil 66 by flow of current through the momentarily closed line 67. This causes closing of the motor switch 65 and closing of the interlock switch 74 which becomes mechanically locked in closed position. Upon release of the starting switch 70 from closed position, the current flows to the coil through the shunt line 72 including the normally closed limit switch 73 and the now closed interlock switch 74. The switch 65 closing the motor circuit will be held closed so long as the coil 66 remains energized, i. e. until the circuit of said coil is opened either by opening of the limit switch 73 by release action of the torque arm or by momentarily opening the stop switch 71. Thus the condition established by the momentary closing of the starting switch 70 is such that the limit switch 73 controls the motor circuit to open when release action of the torque arm occurs.

It will be understood that the invention is not intended to be limited to the use of any particular limit switch or circuit controlled thereby.

Referring again to Figs. 1 and 2, it will be remembered that the release action of the torque arm causes a rotative movement of the gear case 2 about the axis of the shaft 1 in the direction of torque reaction. After such release action and stopping of the motor, the torque arm can be restored to its normal operative load-carrying condition by simply turning the gear case in the opposite direction until the connector rod 22 (Fig. 5) or 122 (Fig. 11) is moved to the position in which it becomes locked by engagement of the balls 29 in the cam groove 30. In this operation, the limit switch actuator or plunger 46 if controlled as in Figs. 5, 9 and 10 is cammed to its normal up position on the rear end rod portion 58 (Fig. 5). In the case of the alternative construction of Fig. 11, movement of the rod 122 to locked position in the tube 125 causes the limit switch plunger 146 to assume its normal down position by snapping into the cam groove 157.

As hereinbefore indicated, the load normally imposed on the torque arm by torque reaction is minimized by arranging the torque arm at an angle of ninety degrees to the line of centers of the shaft 1 and pivot bolt 18. The nearer said angle is to ninety degrees, the less is the load so imposed, which may be held fairly close to minimum if said angle is only about ten degrees more or less than ninety degrees.

As to the angle between the line of centers of the belt pulleys and the line of centers of the shafts 1 and 4, the nearer this angle is to ninety degrees, the greater is the relief in belt tension by release action of the torque arm. Substantial relief in belt tension by release action of the torque arm is obtainable if said angle be from about 60° to 120°.

The overload release connector herein disclosed is separately claimed in my application Serial No. 320,467, filed November 14, 1952, as a division of this application.

I claim:

1. In combination with a mounted shaft to be driven, a gear case rotatably mounted on said shaft, a power-input shaft carried by said gear case, said power-input shaft being parallel with and spaced laterally from said first mentioned shaft, speed-reducing gearing connecting said shafts, a stationarily mounted motor, means comprising a driving belt for driving said power-input shaft from the motor, a torque arm pivoted to said gear case and to a fixed anchorage for holding the gear case from rotative movement, said torque arm comprising relatively longitudinally displaceable sections and spring-held locking means normally holding said sections in fixed axial relation, said locking means being releasable by a forced relative movement of said sections in the direction of the longitudinal force on the torque arm when such force exceeds a predetermined value, the motor being positioned so that the tension of the driving belt imposes on the gear case a turning moment in the direction of torque reaction, whereby the releasing action of the torque arm causes shortening of the distance between the belt pulleys to relieve the belt tension.

2. An organization according to claim 1 wherein the line of centers of the belt pulleys is at an angle of about ninety degrees to the line of centers of said shafts.

3. An organization according to claim 1 having the torque arm arranged at an angle of about ninety degrees to the line of centers of said first mentioned shaft and the pivot of the torque arm to the gear case.

4. An organization according to claim 1 wherein the line of centers of the belt pulleys is at an angle of from about 60° to about 120° to the line of centers of said shafts.

5. An organization according to claim 1 having the line of centers of the belt pulleys at an angle of from about 60° to about 120° to the line of centers of said shafts, and having the torque arm arranged at an angle of from about 80° to about 100° to the line of centers of said first mentioned shaft and the pivot of the torque arm to the gear case.

6. In a power transmission the combination of a speed reducer, means providing a rockable support therefor, said speed reducer including a drive shaft laterally offset from the rocking axis provided by said support, means including a belt for driving said shaft, and means reacting on said speed reducer to normally maintain a driving tension in said belt, said last named means including a detent releasable in response to a predetermined torque load on said speed reducer to thereby release the driving tension in said belt.

7. In a power transmission the combination of a plurality of pulleys, a belt engaged therewith to provide a driving connection therebetween, a support for one of said pulleys movable to control the tension in said belt, and means reacting on said support to normally maintain a driving tension in said belt, said last named means including torque responsive detent means for releasing the tension in said belt in the event of overload.

8. In overload release means for a power transmission unit including a gear case accommodating a power output shaft and a power input shaft spaced laterally from the power output shaft and speed reducing gears connecting said shafts, said gear case being rockably mounted on said output shaft, means including a belt for driving said input shaft, a torque arm reacting on said gear case to normally maintain a predetermined driving tension in said belt, a detent carried on said arm and releasable in response to a predetermined torque load on the gear case to release said arm, an electrical limit switch, and mechanism actuated by release of said detent for opening said switch.

References Cited in the file of this patent

UNITED STATES PATENTS

| | | |
|---|---|---|
| 2,108,367 | Christian | Feb. 15, 1938 |
| 2,329,182 | Boynton | Sept. 14, 1943 |
| 2,340,465 | Gerlach | Feb. 1, 1944 |
| 2,346,047 | Otto | Apr. 4, 1944 |
| 2,504,624 | Barnes | Apr. 18, 1950 |
| 2,516,642 | Murphy | July 25, 1950 |
| 2,554,969 | Williams | May 29, 1951 |
| 2,556,259 | Dorres et al. | June 12, 1951 |

FOREIGN PATENTS

| | | |
|---|---|---|
| 548,416 | Germany | Apr. 15, 1932 |
| 908,471 | France | Sept. 17, 1945 |